(12) United States Patent
Koustubhan et al.

(10) Patent No.: US 11,814,178 B2
(45) Date of Patent: Nov. 14, 2023

(54) LIFT ASSIST SYSTEM FOR AN AIRCRAFT SEAT

(71) Applicant: BE Aerospace, Inc., Winston-Salem, NC (US)

(72) Inventors: Arjun Koustubhan, Hyderabad (IN); Sambasiva Rao Kodati, Kaikalur (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/501,223

(22) Filed: Oct. 14, 2021

(65) Prior Publication Data

US 2023/0065564 A1 Mar. 2, 2023

(30) Foreign Application Priority Data

Sep. 2, 2021 (IN) .............................. 202141039810

(51) Int. Cl.
*B64D 11/06* (2006.01)

(52) U.S. Cl.
CPC ...... *B64D 11/06395* (2014.12); *B64D 11/064* (2014.12)

(58) Field of Classification Search
CPC .................. B64D 11/064; B64D 11/06395
See application file for complete search history.

(56) References Cited

U.S. PATENT DOCUMENTS

| | | | |
|---|---|---|---|
| 5,833,315 A | 11/1998 | Johnston | |
| 6,039,402 A | 3/2000 | Nemoto | |
| 7,766,421 B2 | 8/2010 | Lawson | |
| 8,201,890 B1 | 6/2012 | Mihara | |
| 8,585,146 B1 * | 11/2013 | Giasson | B64D 11/064 297/344.21 |
| 9,730,518 B1 | 8/2017 | Jacobs et al. | |
| 9,931,256 B2 | 4/2018 | White et al. | |
| 2010/0032994 A1 | 2/2010 | Lawson | |
| 2010/0193634 A1 | 8/2010 | Hankinson et al. | |
| 2010/0308167 A1 * | 12/2010 | Hawkins | B64D 11/064 244/122 R |
| 2012/0169099 A1 | 7/2012 | Horiguchi et al. | |
| 2015/0108804 A1 | 4/2015 | Meister et al. | |
| 2021/0145676 A1 | 5/2021 | Torikai et al. | |

FOREIGN PATENT DOCUMENTS

| | | |
|---|---|---|
| EP | 0980825 A2 | 2/2000 |
| EP | 3315409 B1 | 6/2020 |
| WO | 2013038876 A1 | 3/2013 |
| WO | 2020043776 A1 | 3/2020 |

OTHER PUBLICATIONS

Extended Search Report in European Application No. 22167941.8 dated Sep. 8, 2022, 13 pages.

* cited by examiner

*Primary Examiner* — Anthony D Barfield
(74) *Attorney, Agent, or Firm* — Suiter Swantz pc llo

(57) ABSTRACT

A lift assist system for an aircraft seat is disclosed. The lift assist system may include one or more pivoting lift rails configured to couple to one or more fixed seat pan rails of a seat pan frame. The lift assist system may include an actuator sub-system. The actuator sub-system may include an actuator configured to actuate the seat pan frame between one or more positions by actuating the one or more pivoting lift rails a predetermined distance.

13 Claims, 15 Drawing Sheets

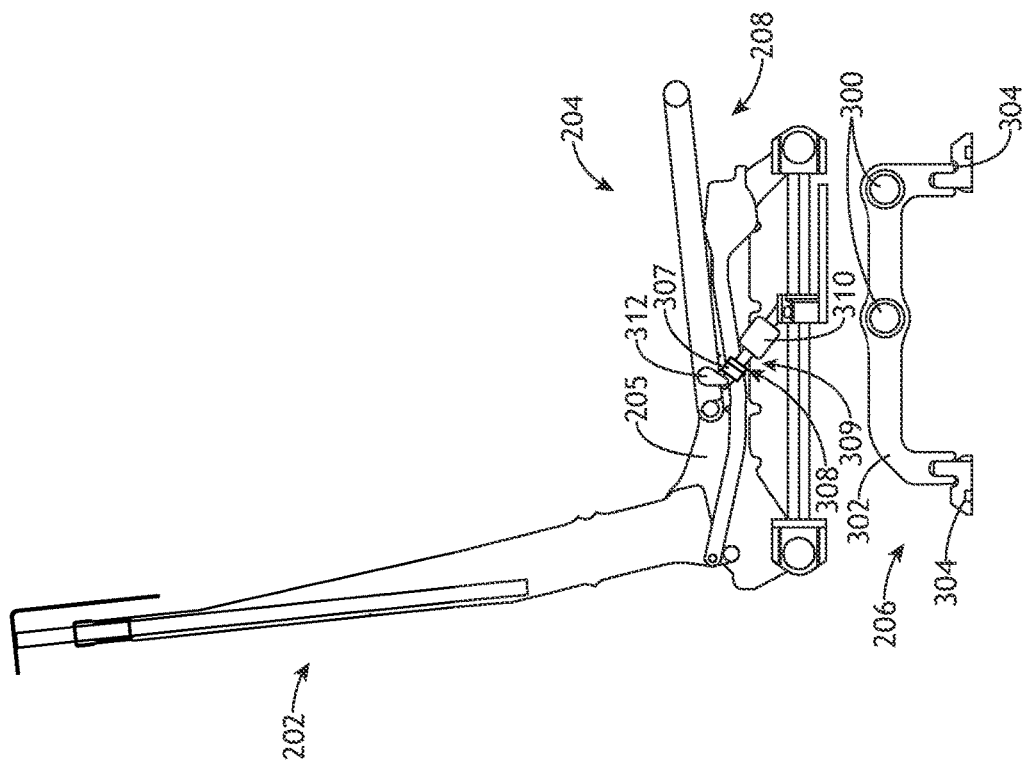
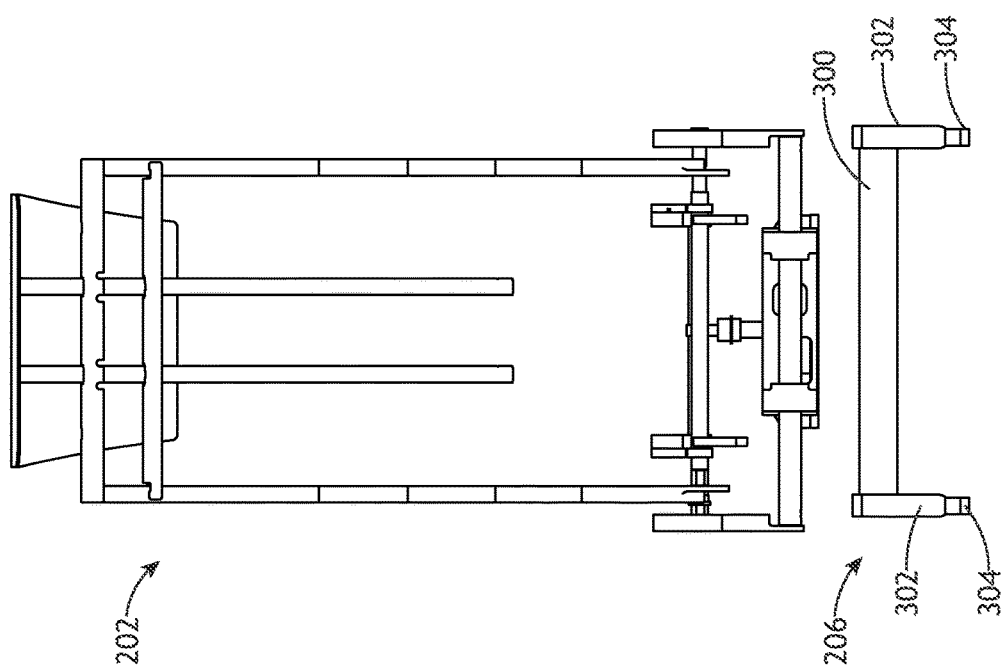

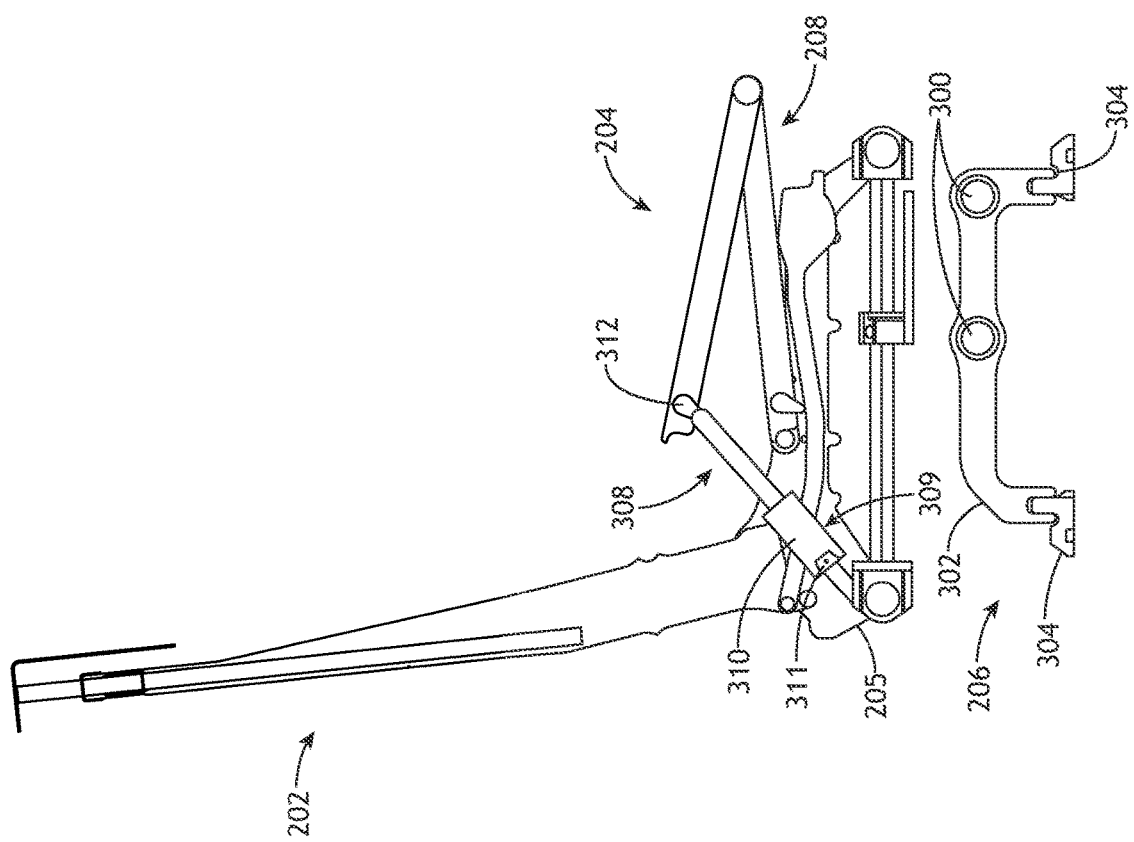

LIFT ASSIST SYSTEM FOR AN AIRCRAFT SEAT

CROSS-REFERENCE TO RELATED APPLICATIONS

The present application claims the benefit of India Provisional Patent Application Serial Number 202141039810, filed on Sep. 2, 2021, entitled LIFT ASSIST SYSTEM FOR AN AIRCRAFT SEAT, naming Arjun Koustubhan and Sam basiva Kodati as inventors, which is incorporated by reference in the entirety.

BACKGROUND

The lack of movement during long-haul flights often causes passengers to feel sluggish. As such, it becomes increasingly difficult for passengers to get up from their seat.

SUMMARY

An aircraft seat is disclosed, in accordance with one or more embodiments of the disclosure. The aircraft seat includes a base assembly couplable to a floor of an aircraft. The aircraft seat includes a seat frame coupled to the base assembly, the seat frame including a seat pan frame and a seatback frame, the seat pan frame including one or more fixed seat pan rails, the seat pan frame configured to couple to a seat pan cushion, the seatback frame configured to couple to a seatback cushion. The aircraft seat includes a lift assist system configured to position the seat pan frame between one or more positions. The lift assist system includes one or more pivoting lift rails configured to couple to the one or more fixed seat pan rails. The lift assist system includes an actuator sub-system, the actuator sub-system comprising an actuator configured to actuate the one or more pivoting lift rails between the one or more positions.

In some embodiments, the actuator sub-system may further include one or more pivots coupled to one or more fixed cross seat pan rails, the one or more pivots configured to couple the actuator to the one or more pivoting lift rails.

In some embodiments, the actuator may be configured to actuate the seat pan frame between a stowed position and a deployed position by lifting the one or more pivoting lift rails a predetermined distance to cause the seat pan frame to lift the predetermined distance.

In some embodiments, the actuator may be configured to apply an amount of force in an upward direction to the one or more fixed cross seat pan rails to cause the one or more pivoting lift rails to lift the predetermined distance to cause the seat pan frame to lift the predetermined distance.

In some embodiments, the aircraft seat may further include a control panel communicatively coupled to an aircraft controller, the control panel coupled to the actuator sub-system to cause the actuator sub-system to actuate the one or more pivoting lift rails a predetermined distance.

In some embodiments, the actuator may include an electro-mechanical actuator.

In some embodiments, the lift assist system may further include a translation sub-system, the translation sub-system including one or more tracking rails positioned between the one or more pivoting lift rails and the one or more fixed seat pan rails; and a slot-and-groove assembly configured to translate the seat pan frame a select distance away from a seatback frame of the aircraft seat, the slot-and-groove assembly including one or more slots positioned on the one or more pivoting lift rails and one or more grooves positioned on the one or more tracking rails, the one or more slots configured to translate along the one or more grooves to translate the seat pan frame the select distance away from the seatback frame of the aircraft seat.

In some embodiments, the actuator may be configured to actuate the seat pan frame between a stowed position and a deployed position by lifting the one or more pivoting lift rails a predetermined distance to cause the seat pan frame to lift the predetermined distance when the seat pan cushion and the seatback cushion are separated a select distance.

In some embodiments, the aircraft seat may further include a control panel communicatively coupled to an aircraft controller, the control panel coupled to the translation sub-system to cause the translation sub-system to translate the seat pan frame the select distance away from the seatback frame.

A lift assist system for an aircraft seat is disclosed, in accordance with one or more embodiments of the disclosure. The lift assist system includes one or more pivoting lift rails configured to couple to one or more fixed seat pan rails of a seat pan frame. The lift assist system includes an actuator sub-system, the actuator sub-system comprising an actuator configured to actuate the seat pan frame between one or more positions by actuating the one or more pivoting lift rails a predetermined distance.

In some embodiments, the lift assist system may further include a translation sub-system, the translation sub-system including one or more tracking rails positioned between the one or more pivoting lift rails and the one or more fixed seat pan rails; and a slot-and-groove assembly configured to translate the seat pan frame a select distance away from a seatback frame of the aircraft seat, the slot-and-groove assembly including one or more slots positioned on the one or more pivoting lift rails and one or more grooves positioned on the one or more tracking rails, the one or more slots configured to translate along the one or more grooves to translate the seat pan frame the select distance away from the seatback frame of the aircraft seat.

In some embodiments, the actuator may be configured to actuate the seat pan frame between a stowed position and a deployed position by lifting the one or more pivoting lift rails a predetermined distance to cause the seat pan frame to lift the predetermined distance when the seat pan cushion and the seatback cushion are separated a select distance.

In some embodiments, the actuator sub-system may further include one or more pivots coupled to one or more fixed cross seat pan rails, the one or more pivots configured to couple the actuator to the one or more pivoting lift rails.

In some embodiments, the actuator may be configured to actuate the seat pan frame between a stowed position and a deployed position by lifting the one or more pivoting lift rails a predetermined distance to cause the seat pan frame to lift the predetermined distance.

In some embodiments, the actuator may be configured to apply an amount of force in an upward direction to the one or more fixed cross seat pan rails to cause the one or more pivoting lift rails to lift the predetermined distance to cause the seat pan frame to lift the predetermined distance.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3A illustrates a rear view of the seat frame of the aircraft seat including the lift assist system in a stowed position, in accordance with one or more embodiments of the disclosure;

FIG. 3B illustrates a side view the seat frame of the aircraft seat including the lift assist system in a stowed position, in accordance with one or more embodiments of the disclosure;

FIG. 4C illustrates a side view of the seat frame of the aircraft seat including the lift assist system in a deployed position, in accordance with one or more embodiments of the disclosure;

DETAILED DESCRIPTION OF THE INVENTION

Figure 1:
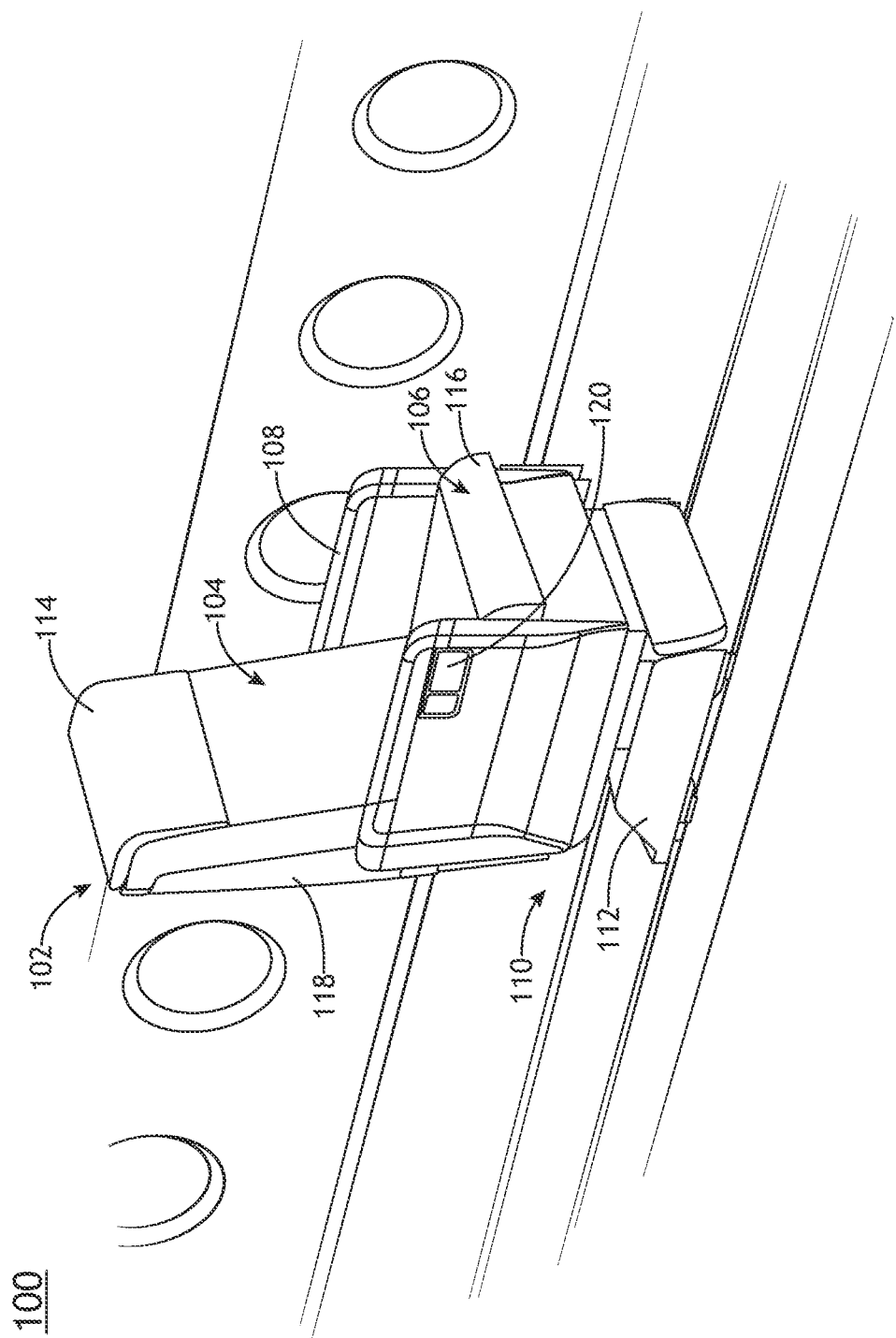
FIG. 1 illustrates an aircraft cabin with an aircraft seat including a lift assist system, in accordance with one or more embodiments of the disclosure.
Figure 2:
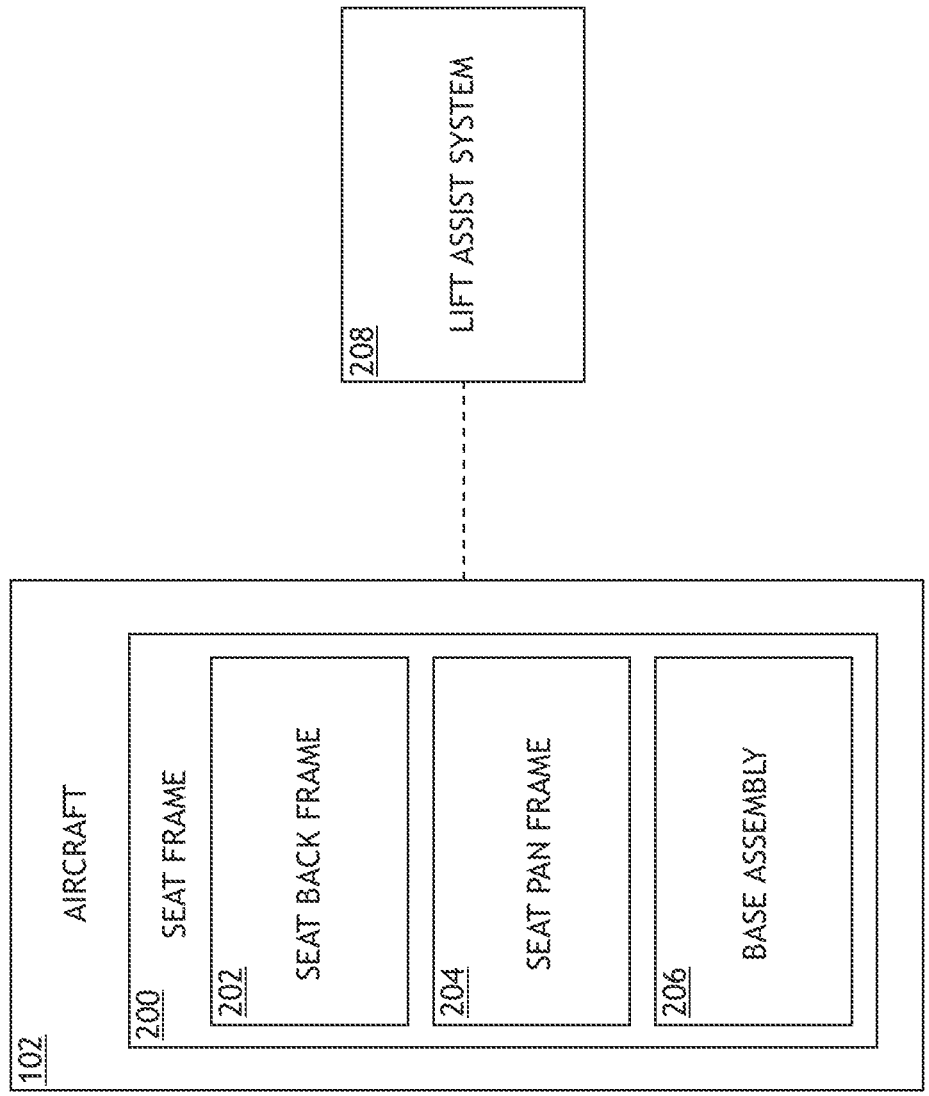
FIG. 2 illustrates a simplified block diagram of the lift assist system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-10C in general illustrate a lift assist system for an aircraft seat, in accordance with one or more embodiments of the disclosure.

The lack of movement during flights, particularly during long-haul flights, often causes passengers to feel sluggish. For example, sitting for long periods slows blood circulation, which may cause fluid to pool in the legs. As such, it becomes increasingly difficult for passengers to get up from their seat. Therefore, there is a need for a lift assist system to assist passengers when getting up from their seat.

Although conventional aircraft seats for long-haul flights include cushions to reduce discomfort during long hours of time, the cushions do not alleviate the inherent problems associated with long-haul flights and do not assist passengers when egressing from their seat.

As such, it would be desirable to provide a lift assist system for an aircraft seat. The lift assist system should be configured to lift a seat pan of the aircraft seat to assist the passenger when getting up from the aircraft seat. The lift assist system should meet aviation guidelines and/or standards.

FIG. 1 in general illustrates an aircraft cabin 100 including an aircraft seat 102, in accordance with one or more embodiments of the disclosure. For example, the aircraft seat 102 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 102 may include a seatback 104. The aircraft seat 102 may include a seat pan 106. The aircraft seat 102 may include one or more arms 108. The aircraft seat 102 may be coupled to a base 110. The base 110 may be covered by a shroud 112. For example, the shroud 112 may include one or more sections configured to cover at least a portion of the aircraft seat 102. For instance, the shroud 112 may include a bucket shroud section and a base shroud section. It is noted, however, that the shroud 112 may be formed from one piece (i.e., includes a single section).

The seatback 104 may include a headrest 114. For example, the headrest 114 may be integrated within the seatback 104. By way of another example, the headrest 114 may be a separate component coupled to (or inserted into) the seatback 104. For instance, the headrest 114 may be movable relative to the seatback frame of the aircraft seat 102 (e.g., adjustable, removable, or the like).

The seat pan 106 may be coupled to the seatback 104, such that actuation of one may cause a corresponding actuation of the other. For example, the seat pan 106 may be coupled to the seatback 104 via one or more pivot joints. For instance, the seatback 104 may be configured to rotate about an axis through a pivot joint coupling the seatback 104 and the seat pan 106 during actuation between the upright position and the lie-flat or bed position.

Referring generally to FIGS. 2-9C, the aircraft seat 102 may include a seat frame 200. The seat frame 200 may include, but is not limited to, a seatback frame 202, a seat pan frame 204, and a base assembly 206.

The aircraft seat 102 may include a seatback frame 202. The aircraft seat 102 may include a seat pan frame 204.

One or more of the seatback frame 202 and/or the seat pan frame 204 may be directly coupled, or indirectly coupled via one or more interconnecting components, to one or more components of the seat frame 200. At least a portion of the shroud 112 (e.g., the bucket shroud section of the shroud 112) may be configured to cover the seat pan frame 204.

The aircraft seat 102 (e.g., the base 110, as illustrated in FIG. 1) may include a base assembly 206. Referring to FIGS. 3A-9C the base assembly 206 may include one or more base rails 300 (e.g., tubes, bars, or the like). For example, the one or more base rails 300 may be positioned relative to a particular direction of travel of the aircraft seat 102 including, but not limited to, perpendicular (e.g., cross-wise), parallel (e.g., cross-wise), or the like. For instance, the one or more base rails 300 may be positioned relative to a same or a different direction of travel of the aircraft seat 102.

The base assembly 206 may include one or more base brackets 302. For example, the one or more base rails 300 may be coupled together via the one or more base brackets 302. For example, a base bracket 302 may couple together the base rail 300 and an adjacent base rail 300 at any angle, such that the base assembly 206 may include an outline of any geometric shape known in the art. For instance, the outline may be rectangular or substantially rectangular. Therefore, the above description should not be interpreted as a limitation on the present disclosure but merely an illustration.

The one or more base brackets 302 may be coupled to a set of floor tracks of the aircraft cabin 100 (e.g., as illustrated in FIG. 1) via one or more floor fittings 304. At least a portion of the shroud 112 (e.g., the base shroud section of the shroud 112) may be configured to cover the base assembly 206.

FIGS. 2-9C illustrate a lift assist system 208 for an aircraft seat 102, in accordance with one or more embodiments of the disclosure. It is noted that the description of the various embodiments, components, and operations described previously herein with respect to the aircraft seat 102 should be interpreted to extend to the system 208, and vice versa.

The aircraft seat 102 may include a lift assist system 208. It is noted that the lift assist system 208 may be adapted and mounted in any orientation to cater to various aircraft seat base designs and requirements.

The lift assist system 208 may be configured to lift the seat pan 106 of the aircraft seat 102 to assist the passenger while getting up. For example, the lift assist system 208 may be configured to couple to a portion of the seat pan frame 204 of the aircraft seat 102.

The lift assist system 208 may include one or more pivoting lift rails 500 configured to couple to one or more fixed seat pan rails 502. For example, as shown in FIG. 1, a seat pan cushion 116 of the seat pan 106 may be configured to couple to the seat pan frame 204. For instance, the seat pan cushion 116 may be configured to couple to the one or more pivoting lift rails 500 and the one or more fixed seat pan rails 502. In this regard, when the one or more pivoting lift rails 500 are actuated (as discussed further herein), the one or more pivoting lift rails 500 may be configured to cause the seat pan cushion 116, coupled to the one or more fixed seat pan rails 502, to lift a predetermined distance to assist the passenger when getting up.

Figure 4B:
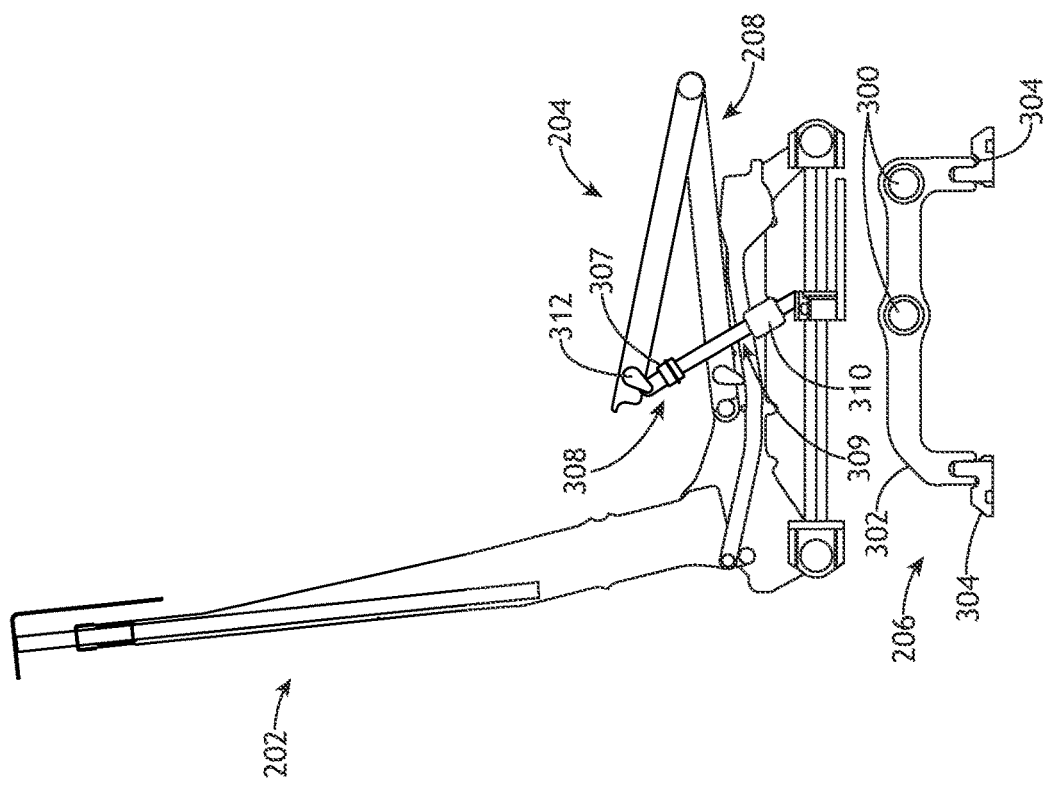
FIG. 4B illustrates a side view the seat frame of the aircraft seat including the lift assist system in a deployed position, in accordance with one or more embodiments of the disclosure.
Figure 4A:
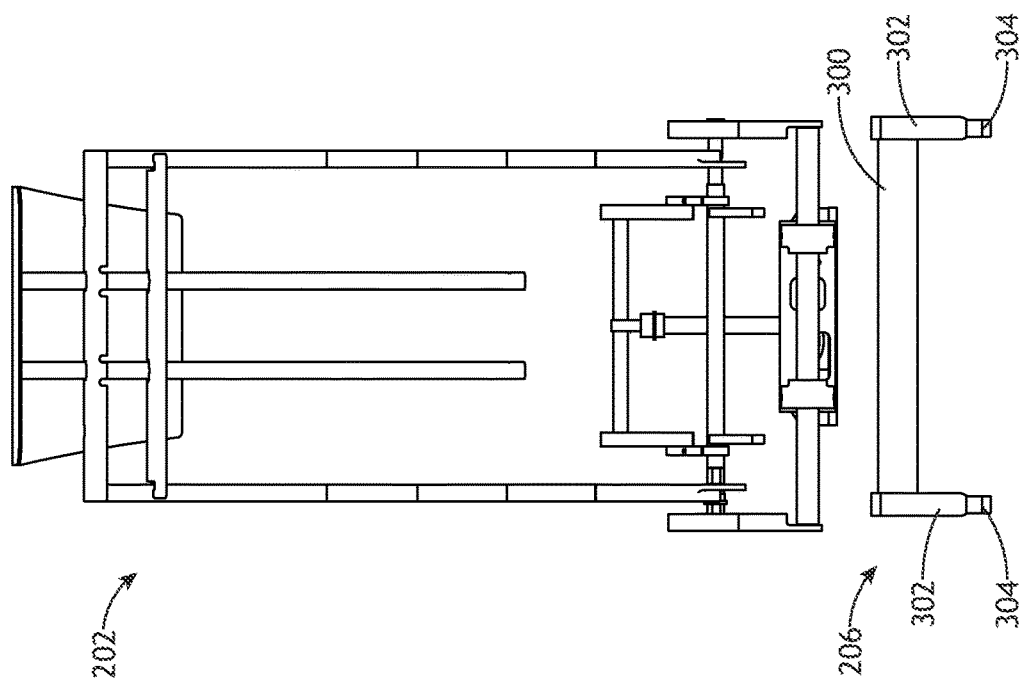
FIG. 4A illustrates a rear view of the seat frame of the aircraft seat including the lift assist system in a deployed position, in accordance with one or more embodiments of the disclosure.
Figure 5:
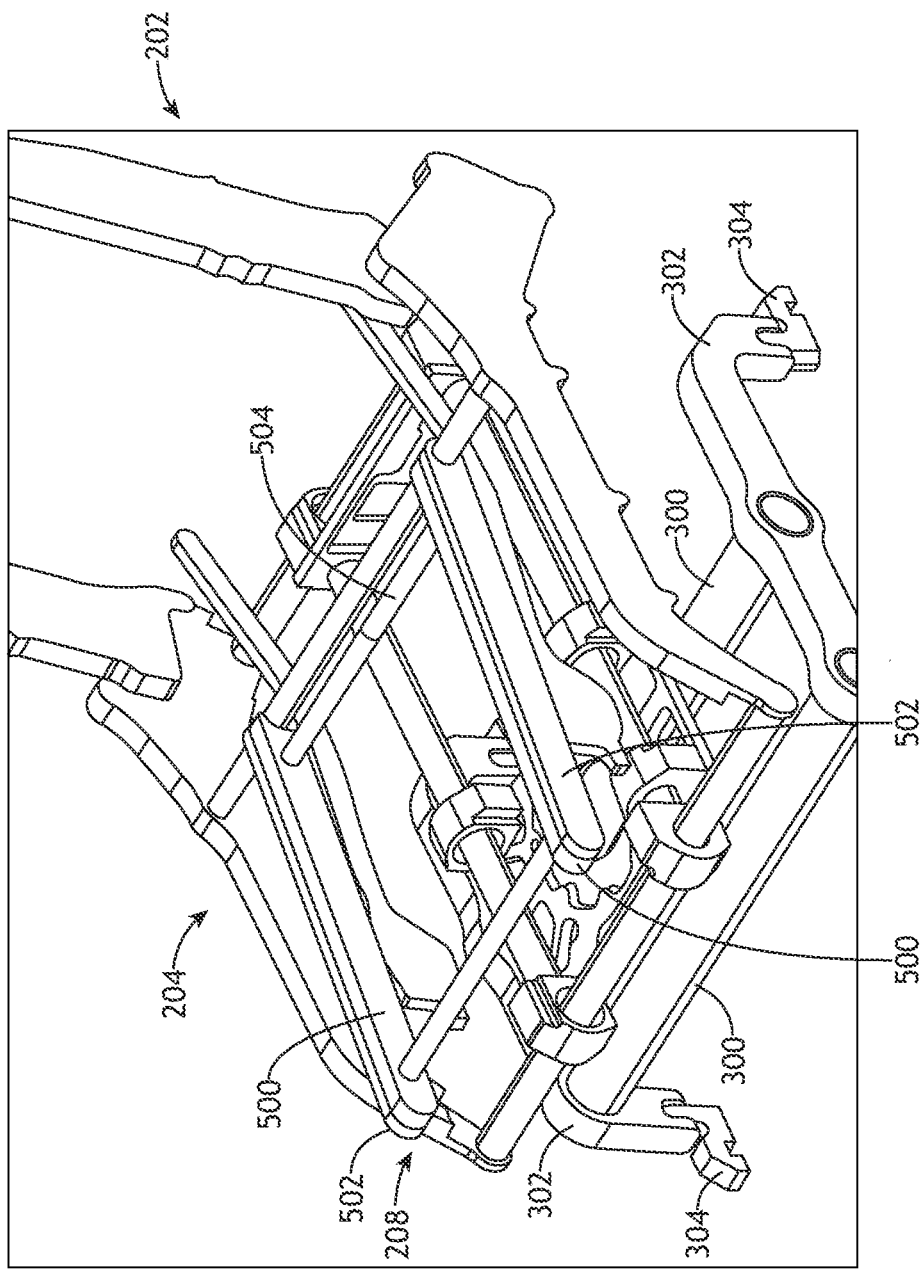
FIG. 5 illustrates an isolated view of the seat pan frame and base assembly of the aircraft seat including the lift assist system, in accordance with one or more embodiments of the disclosure.
Figure 6:
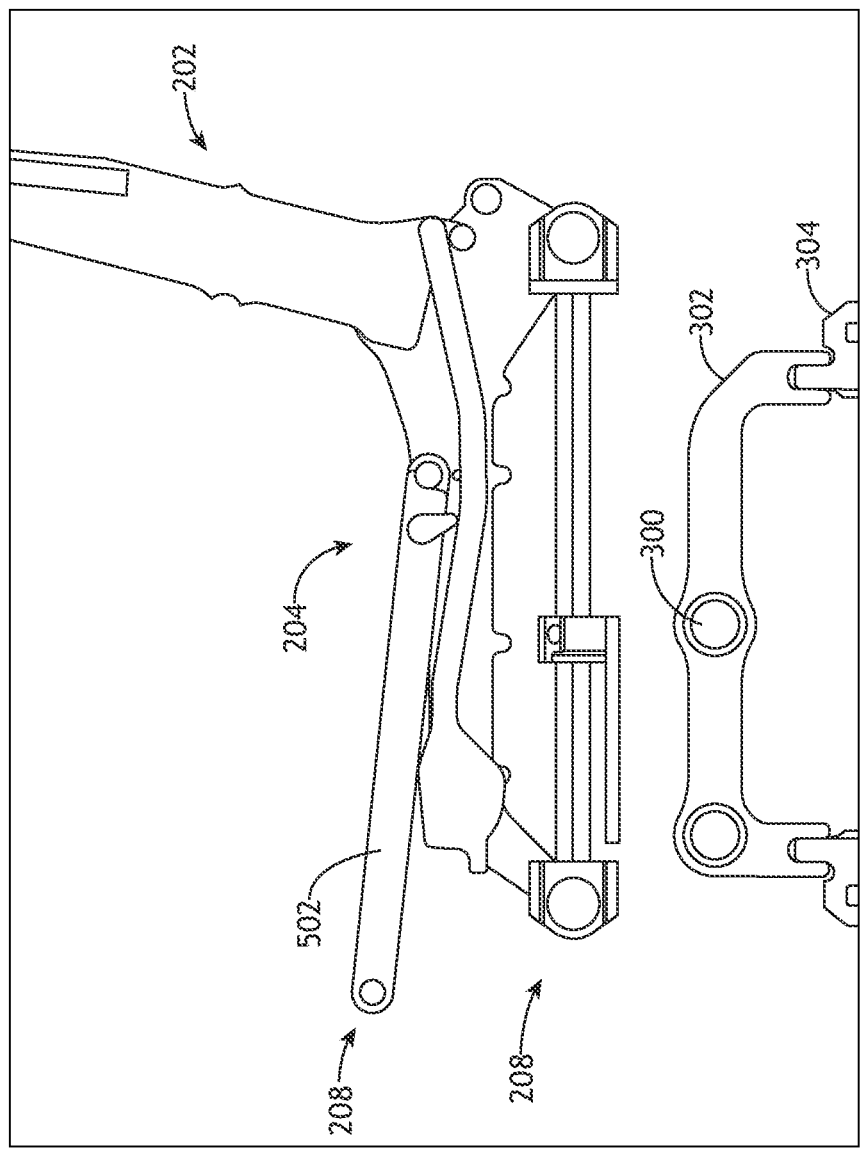
FIG. 6 illustrates an isolated side view of the seat pan frame and base assembly of the aircraft seat including the lift assist system, in accordance with one or more embodiments of the disclosure.
Figure 7A:
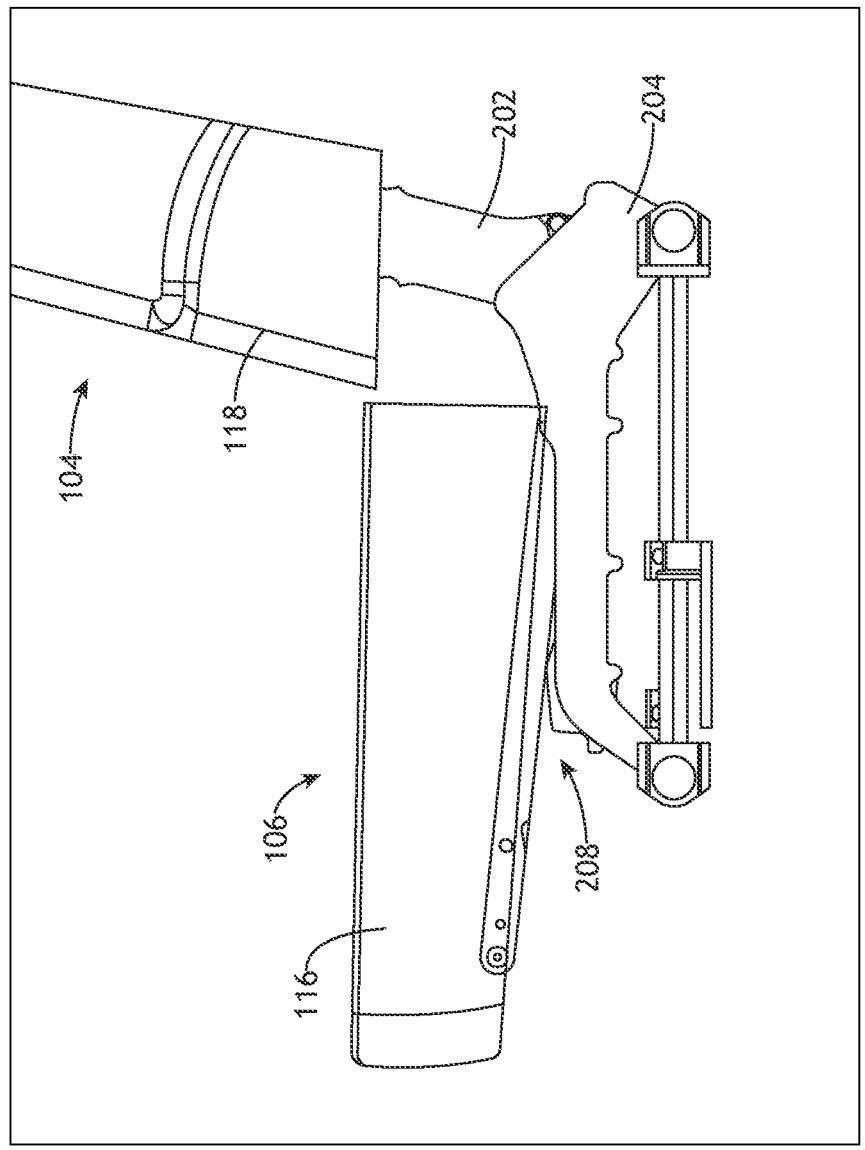
FIG. 7A illustrates an isolated side view of the seat pan frame and base assembly of the aircraft seat including the lift assist system, in accordance with one or more embodiments of the disclosure.
Figure 7B:
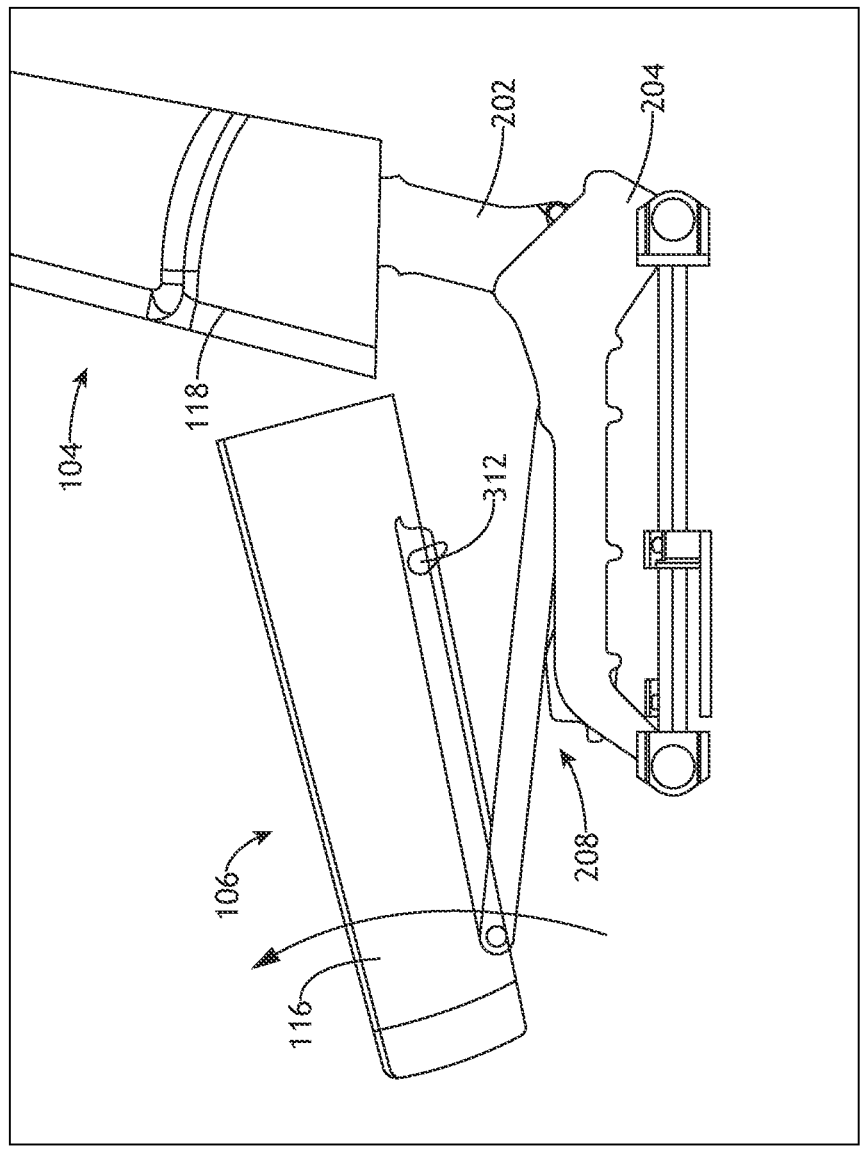
FIG. 7B illustrates an isolated side view of the seat pan frame and base assembly of the aircraft seat including the lift assist system, in accordance with one or more embodiments of the disclosure.
Figure 8A:
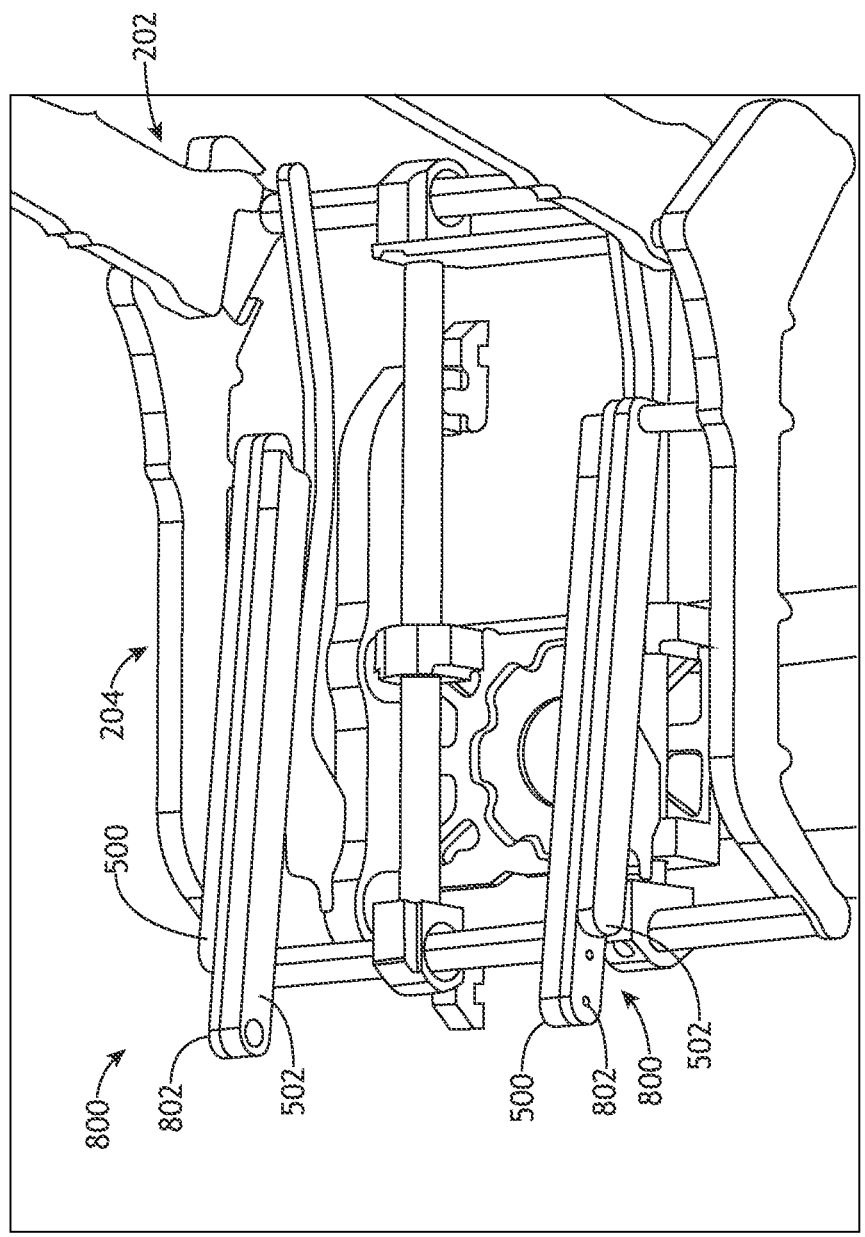
FIG. 8A illustrates an isolated top view of the seat pan frame and base assembly of the aircraft seat including the lift assist system, in accordance with one or more embodiments of the disclosure.
Figure 8B:
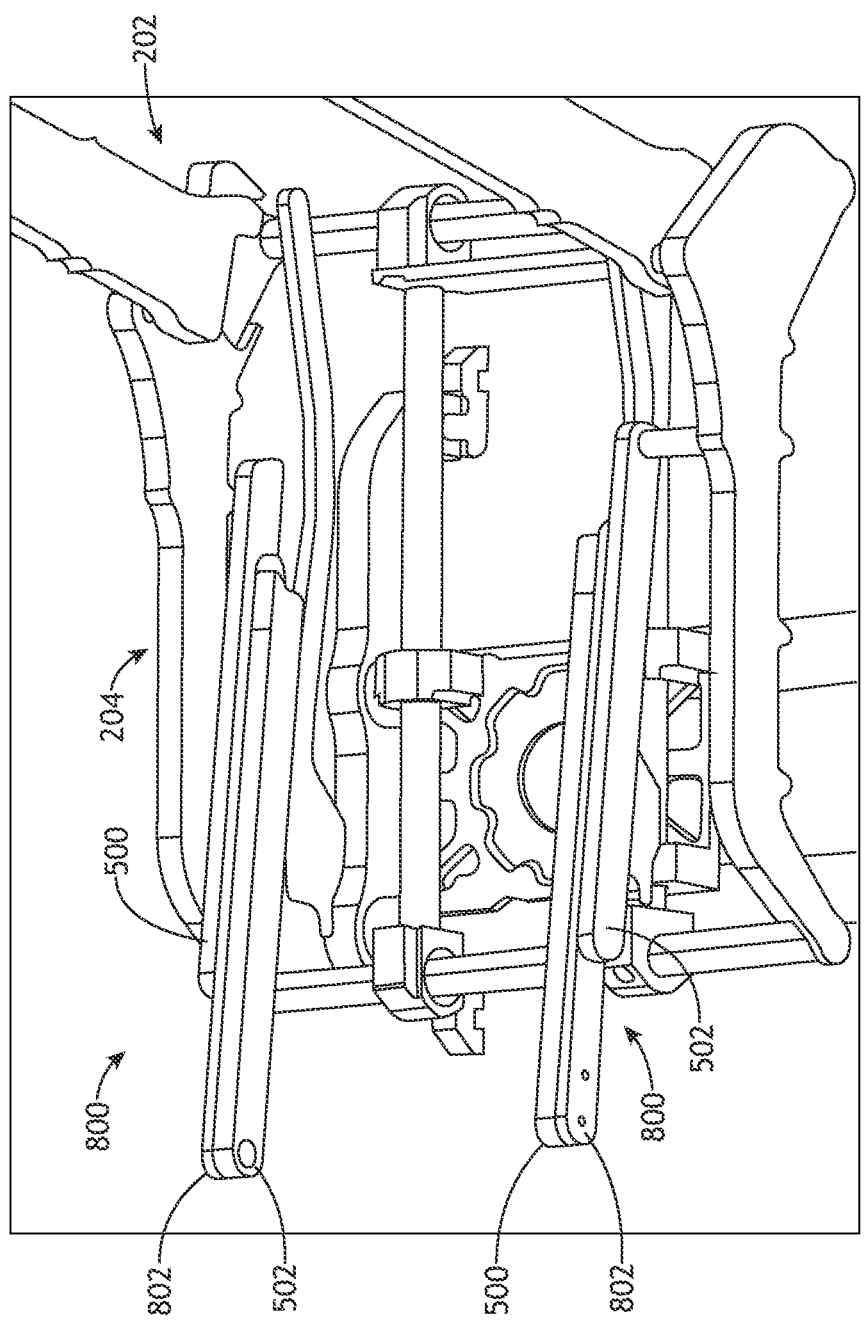
FIG. 8B illustrates an isolated top view of the seat pan frame and base assembly of the aircraft seat including the lift assist system, in accordance with one or more embodiments of the disclosure.

Referring to FIGS. 3A-4C, the lift assist system 208 may include an actuator sub-system 308. The actuator sub-system 308 may include an actuator 309. In some embodiments, as shown in FIGS. 3A-4C, the actuator may include, but is not limited to, a piston 307 (movable portion of the actuator) and a body/chassis 310 (fixed portion of the actuator) configured to actuate the one or more pivoting lift rails 500 between one or more positions. For instance, the piston 307 may be configured to actuate the one or more pivoting lifts rails 500 between a stowed (or normal) position, as shown in FIGS. 3A-3B, to a deployed (or lifted) position, as shown in FIGS. 4A-4C, and vice versa. In this regard, the one or more pivoting lift rails 500 may be configured to actuate a seat pan 106 and/or a seat pan cushion 116 (without causing the seatback 104 and/or seatback cushion 118 to actuate) between the stowed position and the deployed position, and vice versa, by actuating the one or more pivoting lift rails 500.

Referring to FIG. 4B-4C, the actuator sub-system 308 may be installed on any location of the seat frame 200. For example, as shown in FIG. 3B, the piston 307 may be coupled to the pivot 312 and the body/chassis 310 may be coupled via a pivot to the seat frame 205. By way of another example, as shown in FIG. 3C, the piston 307 may be coupled to the pivot 312 and the body/chassis 310 may be coupled via a pivot 311 to the seat frame 205.

The actuator sub-system 308 may be configured to couple to the one or more pivoting lift rails 500 via one or more pivots 312. For example, the one or more pivots 312 may be coupled to one or more fixed cross rails 504 coupled to the one or more pivoting lift rails 500. For instance, when the actuator sub-system 308 actuates between the one or more positions (e.g., stowed/normal position and deployed/lifted position, and vice versa), the actuator sub-system 308 may apply an amount of force to the one or more fixed cross rails 504 to cause the one or more pivoting lift rails 500 to lift a predetermined distance which then causes the seat pan cushion 116 to lift, without lifting the seatback cushion 118 and/or seatback frame 202. In this regard, the lifting of the seat pan cushion 116 a predetermined distance, via the one or more pivoting lift rails 500 and the actuator sub-system 308, provides the passenger assistance when they are getting up from the aircraft seat 102.

The actuator sub-system 308 may include any type of actuator known in the art including, but not limited to, one or more electro-mechanical actuators, gas spring actuators, linear/rotary actuators, or the like. It is noted that for purposes of simplicity, the actuator sub-system 308 and/or one or more components of the actuator sub-system 308 are not depicted in FIGS. 7A-9C, as such FIGS. 7A-9C are provided merely for illustrative purposes and shall not be construed as limiting the scope of the present disclosure. Further, although FIGS. 3A-4C depict a specific actuator sub-system configuration, it is noted that the actuator sub-system 308 may be configured in any manner suitable for lifting one or more components of the lift assist system, as such FIGS. 3A-4C are provided merely for illustrative purposes and shall not be construed as limiting the scope of the present disclosure.

Referring to FIGS. 8A-10C, in some embodiments, the lift assist system 208 may include a translation sub-system 800 configured to translate the seat pan 106. For example, the translation sub-system 800 may be configured to translate the seat pan 106 including the seat pan cushion 116 and seat pan frame 204 in a forward direction away from the seatback 104, such that the seat pan cushion 116 does not overlap with the seatback cushion 118 and/or seatback frame 202. In this regard, the seat pan 106 may be actuated without actuating the seatback 104 and/or seatback cushion 118 of the aircraft seat 102. It is noted that the independent actuation of the seat pan 106 and/or seat pan cushion 116 is a space saving mechanism. For example, the independent actuation does not require too much space surrounding the aircraft seat 102 to operate the lift assist system 208. However, in conventional systems that actuate the seatback 104 and/or seatback cushion 118, an ample amount of space surrounding the aircraft seat is needed to operate the system.

Figure 10A:
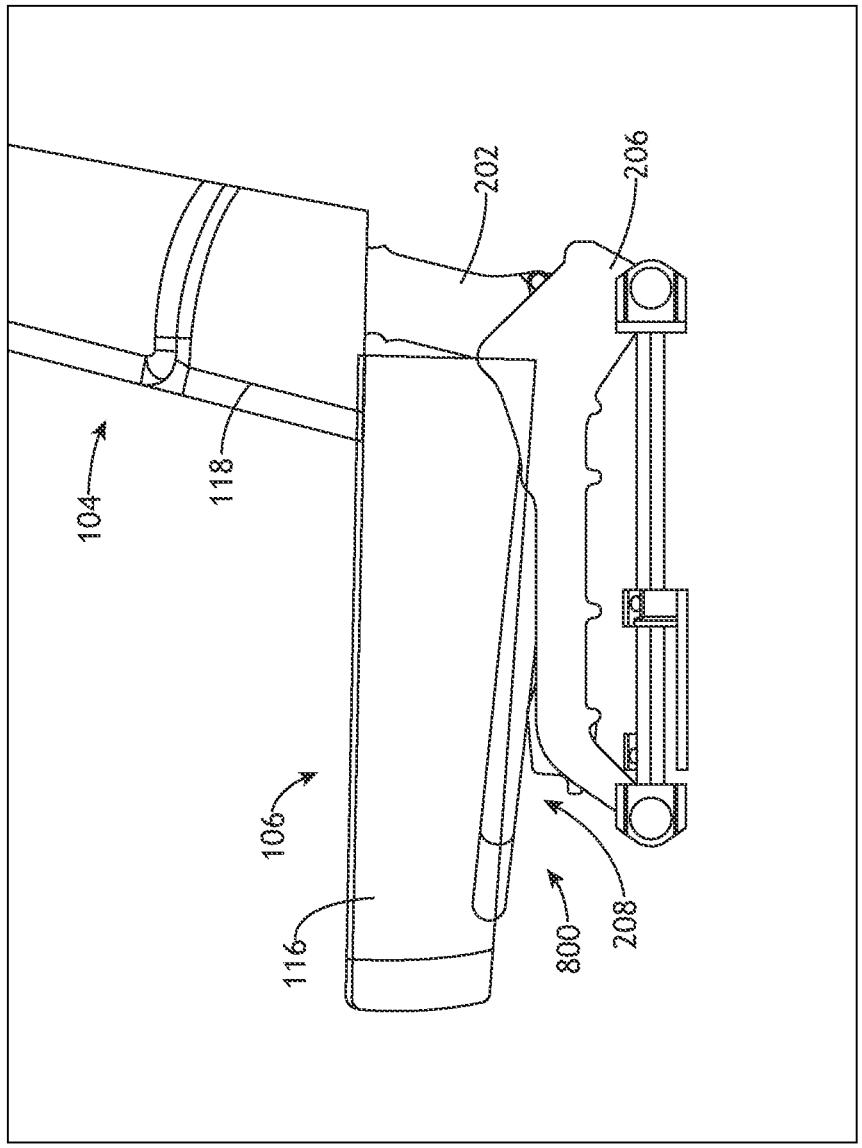
FIG. 10A illustrates an isolated top view of the seat pan frame and base assembly of the aircraft seat including the lift assist system, in accordance with one or more embodiments of the disclosure.
Figure 10B:
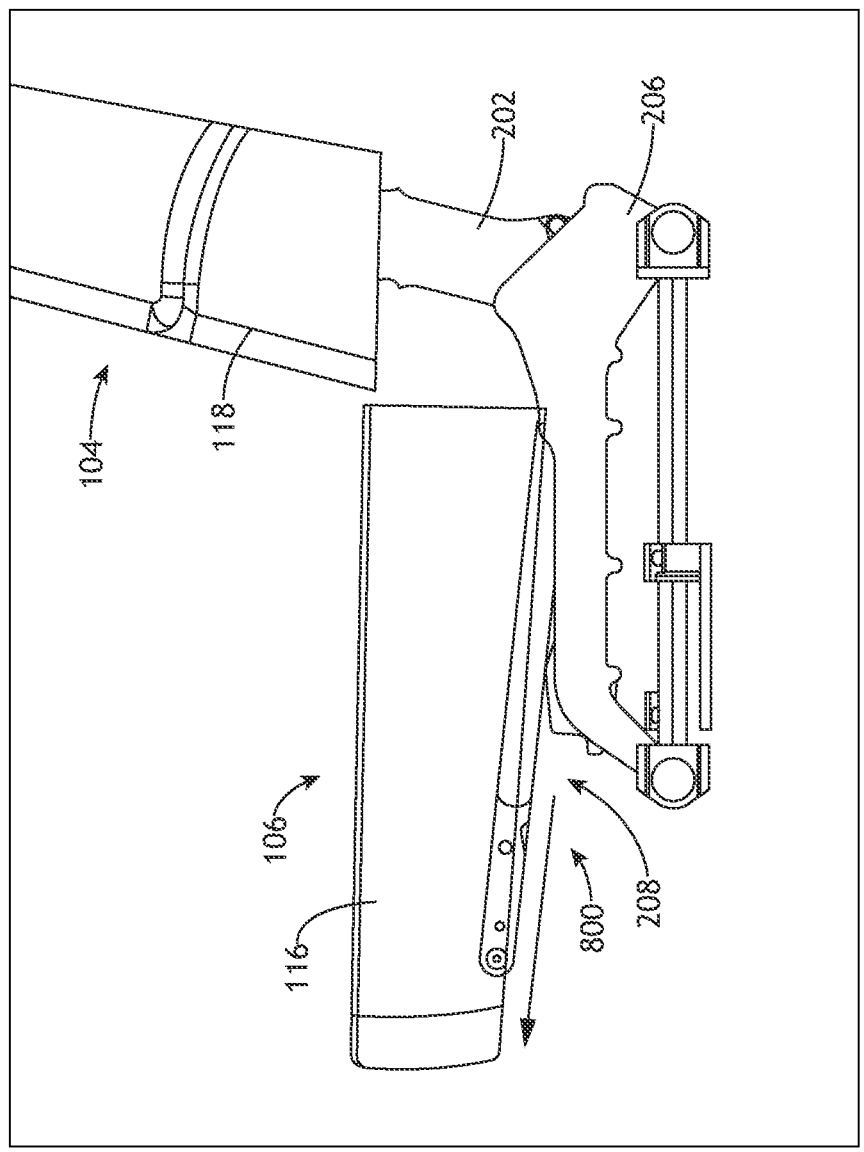
FIG. 10B illustrates an isolated top view of the seat pan frame and base assembly of the aircraft seat including the lift assist system, in accordance with one or more embodiments of the disclosure.
Figure 10C:
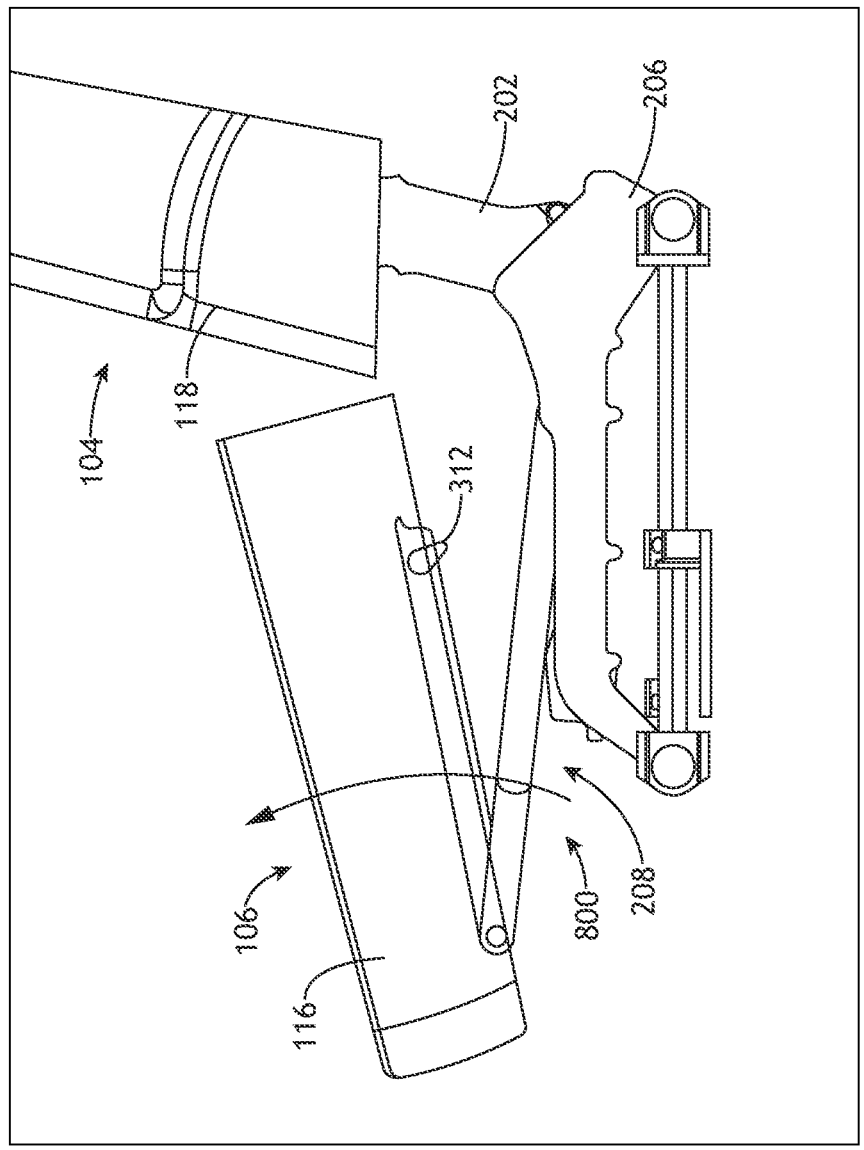
FIG. 10C illustrates an isolated top view of the seat pan frame and base assembly of the aircraft seat including the lift assist system, in accordance with one or more embodiments of the disclosure.

The translation sub-system 800 may include one or more tracking rails 802 positioned between the one or more pivoting lift rails 500 and the one or more fixed seat pan rails 502. For example, the one or more tracking rails 802 may be coupled to the one or more pivoting lift rails 500, such that the one or more tracking rails 802 and the one or more pivoting lift rails 500 may translate along the axis of the one or more fixed seat pan rails 502. In this regard, the one or more tracking rails 802 may translate the seat pan cushion 116 a select distance before lifting the seat pan cushion 116, such that the seat pan cushion 116 and the seatback cushion 118 do not overlap, as shown in FIGS. 10A-10C.

Figure 9:
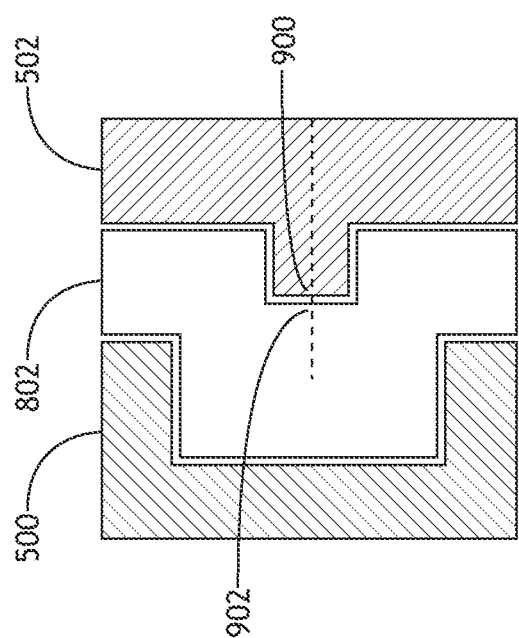
FIG. 9 illustrates a cross-sectional view of a translation sub-system of the lift assist system, in accordance with one or more embodiments of the disclosure.

Referring to FIG. 9, the translation sub-system 800 may include a slot-and-groove assembly configured to translate the seat pan 106. For example, the one or more fixed seat pan rails 502 may include one or more grooves 900 and the one or more tracking rails 802, coupled to the one or more pivoting lift rails 500, may include one or more slots 902. For instance, the one or more tracking rails 802 may translate the seat pan cushion 116 a select distance, via the slot-and-groove assembly. In this regard, the one or more slots 902 may translate along the one or more grooves 900 to translate the seat pan cushion 116 a select distance (e.g., until the seat pan cushion 116 and seatback cushion 118 do not overlap, as shown in FIGS. 10A-10C).

The lift assist system 208 may be adjusted electrically. For example, the lift assist system 208 may include a control panel 120 for adjusting the lift assist system 208. For instance, as shown in FIG. 1, the aircraft seat 102 may include a control panel 120 within a portion of the one or more arm rests 108. For instance, when a passenger needs assistance getting up, the control panel 120 may be used to lift the seat pan cushion 116 a select distance. Further, the control panel 120 may be used to translate the seat pan cushion 116 a select distance until the seat pan cushion 116 does not overlap with the seatback cushion 118, then the control panel 120 may be used to lift the seatback cushion 118 a select distance. The control panel 120 may be coupled to an aircraft controller.

Although FIG. 1 depicts the control panel 120 coupled to a portion of the arm rests 108, it is noted that the control panel 120 may be coupled to any portion of the aircraft seat 102 and/or to any portion of the aircraft cabin 100 (e.g., an overhead portion of the aircraft seat 102, an in-flight entertainment device, or the like).

It is noted herein "vertical" may be understood as being defined with respect to a z-axis as illustrated in the Figures. In addition, it is noted herein "horizontal" may be understood as being defined with respect to an x-axis or a y-axis as illustrated in the Figures.

It is noted the aircraft seat 102 and/or the components of the aircraft seat 102 (e.g., the lift assist system 208 and other components) may be installed within an avionics environment and configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Although embodiments of the disclosure are directed to an avionics environment, it is noted the lift assist system 208 is not limited to the aircraft seat 102 within the avionics environment and/or the aircraft components within the avionics environment. For example, the lift assist system 208 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the lift assist system 208 may be coupled to and/or configured to operate with apparatus sold for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, the aircraft seat comprising:
   a base assembly couplable to a floor of an aircraft;
   a seat frame coupled to the base assembly, the seat frame including a seat pan frame and a seatback frame, the seat pan frame including one or more fixed seat pan rails, the seat pan frame configured to couple to a seat pan cushion, the seatback frame configured to couple to a seatback cushion; and
   a lift assist system configured to position the seat pan frame between a stowed position and a deployed position, the lift assist system comprising:
      one or more pivoting lift rails configured to directly couple to the one or more fixed seat pan rails, the one or more pivoting lift rails arranged substantially parallel to the one or more fixed seat pan rails when in the stowed position;
      an actuator sub-system, the actuator sub-system including an actuator configured to actuate the one or more pivoting lift rails between the stowed position and the deployed position; and
      a translation sub-system, the translation sub-system comprising:
         one or more tracking rails positioned between the one or more pivoting lift rails and the one or more fixed seat pan rails; and
         a slot-and-groove assembly configured to translate the seat pan frame a select distance away from the seatback frame of the aircraft seat, the slot-and-groove assembly including one or more slots positioned on the one or more pivoting lift rails and one or more grooves positioned on the one or more tracking rails, the one or more slots configured to translate along the one or more grooves to translate the seat pan frame the select distance away from the seatback frame of the aircraft seat.

2. The aircraft seat of claim 1, wherein the actuator sub-system further comprises:
   one or more pivots coupled to one or more fixed cross seat pan rails, the one or more pivots configured to couple the actuator to the one or more pivoting lift rails.

3. The aircraft seat of claim 2, wherein the actuator is configured to actuate the seat pan frame between the stowed position and the deployed position by lifting the one or more pivoting lift rails a predetermined distance to cause the seat pan frame to lift the predetermined distance.

4. The aircraft seat of claim 3, wherein the actuator is configured to apply an amount of force in an upward direction to the one or more fixed cross seat pan rails to cause the one or more pivoting lift rails to lift the predetermined distance to cause the seat pan frame to lift the predetermined distance.

5. The aircraft seat of claim 1, wherein the aircraft seat further comprises:
   a control panel communicatively coupled to an aircraft controller, the control panel coupled to the actuator sub-system to cause the actuator sub-system to actuate the one or more pivoting lift rails a predetermined distance.

6. The aircraft seat of claim 1, wherein the actuator includes an electro-mechanical actuator.

7. The aircraft seat of claim 1, wherein the actuator is configured to actuate the seat pan frame between the stowed position and the deployed position by lifting the one or more pivoting lift rails a predetermined distance to cause the seat pan frame to lift the predetermined distance when the seat pan cushion and the seatback cushion are separated a select distance.

8. The aircraft seat of claim 1, wherein the aircraft seat further comprises:
   a control panel communicatively coupled to an aircraft controller, the control panel coupled to the translation sub-system to cause the translation sub-system to translate the seat pan frame the select distance away from the seatback frame.

9. A lift assist system for an aircraft seat comprising:
   one or more pivoting lift rails configured to directly couple to one or more fixed seat pan rails of a seat pan frame, the one or more pivoting lift rails arranged substantially parallel to the one or more fixed seat pan rails when in a stowed position;
   an actuator sub-system, the actuator sub-system comprising an actuator configured to actuate the seat pan frame between the stowed position and a deployed position by actuating the one or more pivoting lift rails a predetermined distance; and
   a translation sub-system, the translation sub-system comprising:
      one or more tracking rails positioned between the one or more pivoting lift rails and the one or more fixed seat pan rails; and
      a slot-and-groove assembly configured to translate the seat pan frame a select distance away from a seatback frame of the aircraft seat, the slot-and-groove assembly including one or more slots positioned on the one or more pivoting lift rails and one or more grooves positioned on the one or more tracking rails, the one or more slots configured to translate along the one or more grooves to translate the seat pan frame the select distance away from the seatback frame of the aircraft seat.

10. The system of claim 9, wherein the actuator is configured to actuate the seat pan frame between the stowed position and the deployed position by lifting the one or more pivoting lift rails a predetermined distance to cause the seat pan frame to lift the predetermined distance when the seat pan cushion and the seatback cushion are separated a select distance.

11. The system of claim 9, wherein the actuator subsystem further comprises:
one or more pivots coupled to one or more fixed cross seat pan rails, the one or more pivots configured to the couple the actuator to the one or more pivoting lift rails.

12. The system of claim 11, wherein the actuator is configured to actuate the seat pan frame between the stowed position and the deployed position by lifting the one or more pivoting lift rails a predetermined distance to cause the seat pan frame to lift the predetermined distance.

13. The system of claim 12, wherein the actuator is configured to apply an amount of force in an upward direction to the one or more fixed cross seat pan rails to cause the one or more pivoting lift rails to lift the predetermined distance to cause the seat pan frame to lift the predetermined distance.

* * * * *